(12) United States Patent
Huber

(10) Patent No.: US 6,536,305 B2
(45) Date of Patent: Mar. 25, 2003

(54) CUTTING PLATE AND METHOD OF PRESSING A CUTTING PLATE

(75) Inventor: Ronald Huber, Vils (AT)

(73) Assignee: Plansee Tizit Aktiengesellschaft, Reutte (AT)

( * ) Notice: Subject to any disclaimer, the term of this patent is extended or adjusted under 35 U.S.C. 154(b) by 0 days.

(21) Appl. No.: 09/906,321

(22) Filed: Jul. 16, 2001

(65) Prior Publication Data
US 2002/0007701 A1 Jan. 24, 2002

(30) Foreign Application Priority Data
Jul. 14, 2000 (AT) ........................ 516/2000 U

(51) Int. Cl.[7] .................. B21K 5/04; B22F 7/06; B23B 51/00
(52) U.S. Cl. ........................ 76/108.2; 76/108.1
(58) Field of Search ................ 76/108.1, 108.2, 76/108.4, 108.6; 408/144, 227, 231, 232, 713

(56) References Cited

U.S. PATENT DOCUMENTS

| | | | |
|---|---|---|---|
| 1,759,416 A | * 5/1930 | Pleister et al. | 76/108.1 |
| 2,578,351 A | * 12/1951 | Griffiths | 76/108.1 |
| 4,164,063 A | 8/1979 | Cenko et al. | |
| 4,537,097 A | * 8/1985 | Illerhaus et al. | 76/108.2 |
| 4,705,124 A | * 11/1987 | Abrahamson et al. | 76/108.2 |
| 5,043,548 A | 8/1991 | Whitney et al. | |
| 5,075,053 A | * 12/1991 | Bernadic et al. | 264/109 |
| 5,159,857 A | * 11/1992 | Jurewicz | 76/108.2 |
| 5,333,520 A | * 8/1994 | Fisher et al. | 76/108.2 |
| 5,359,172 A | 10/1994 | Kozak et al. | |
| 5,433,655 A | * 7/1995 | Shiokawa et al. | 451/48 |
| 5,855,149 A | 1/1999 | Islam et al. | |

FOREIGN PATENT DOCUMENTS

| | | |
|---|---|---|
| DE | 27 43 992 A1 | 4/1978 |
| DE | 41 30 207 A1 | 3/1993 |
| DE | 44 33 675 A1 | 3/1996 |
| DE | 195 30 641 C1 | 11/1996 |
| DE | 195 33 960 | 3/1997 |
| DE | 196 30 .197 A1 | 1/1998 |
| DE | 196 43 029 A1 | 4/1998 |
| EP | 0 351 287 B1 | 1/1990 |
| EP | 0 415 570 A2 | 3/1991 |
| EP | 0 622 476 A1 | 11/1994 |
| EP | 0 682 999 B1 | 11/1995 |
| EP | 0 818 261 | 1/1998 |
| EP | 0 837 152 A1 | 4/1998 |
| EP | 0 915 184 A1 | 5/1999 |
| EP | 0 950 461 A2 | 10/1999 |
| JP | 61-243103 | 10/1986 |
| WO | WO 99/51426 | 10/1999 |

* cited by examiner

Primary Examiner—Hwei-Siu Payer
(74) Attorney, Agent, or Firm—Laurence A. Greenberg; Werner H. Stemer; Ralph E. Locher

(57) ABSTRACT

The cutting plate for a drill bit is press-formed from a powdery starting material. In the process, the cutting plate is arranged horizontally in the press die and the relative movement of top punch and bottom punch with respect to the die is effected parallel to the flank or flanks of the lateral supporting edge or edges. The novel method enables a variety of special design configurations of the cutting plates.

6 Claims, 2 Drawing Sheets

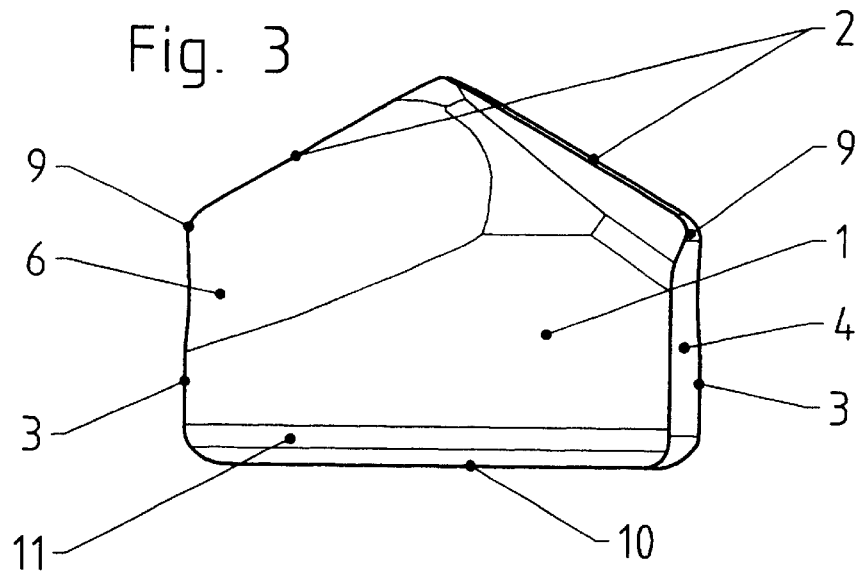
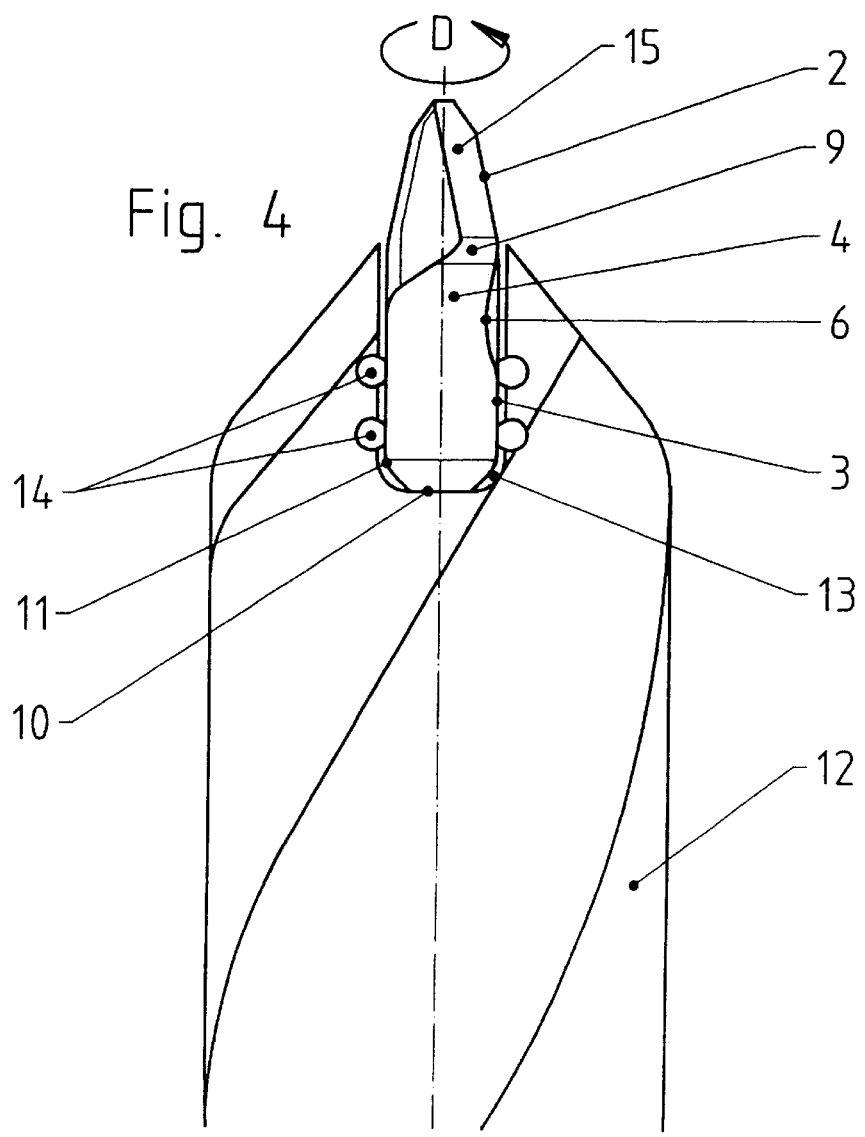

CUTTING PLATE AND METHOD OF PRESSING A CUTTING PLATE

BACKGROUND OF THE INVENTION

Field of the Invention

The invention pertains to a method of pressing a cutting plate of powdery starting material for use in a drill bit. The cutting plate has at least one end cutting edge running from the periphery to the axis of rotation of the drill and at least one lateral supporting edge having a flank for supporting on the wall of the drill hole. The method is carried out with the use of a die and a top punch and a bottom punch which can be moved relative to one another in the die.

Such cutting plates are generally used in drill bits which consist of a cylindrical steel shank having helically twisted flutes for disposing of the drilled-out material and of a drilling head at the end. The drilling head is formed by one or more of these cutting plates, which are made of a wear-resistant material and are typically connected to the steel shank by soldering or brazing.

The cutting plates are as a rule made from hard metal and are produced by powder metallurgy by pressing and sintering an initial powder mixture.

Drill bits having such cutting plates are often used for drilling rock or rock-like material such as brick, concrete or ceramic; but other materials such as metallic materials, wood or plastic can readily be machined as well.

Since many drilling operations are increasingly being carried out with cordless drilling machines, care is to be taken to reduce the cutting forces occurring during the drilling in order to preserve the battery and to achieve as long an operating period as possible. The reduction in the cutting forces is achieved in particular by sharp cutting edges in combination with positive rake angles of the end cutting edges.

Since such drill bits are mass products, they, and in particular also the cutting plates, must be produced as cost-effectively as possible.

In the vast majority of cases, the drilling head of such drill bits is formed by a cutting plate only a few millimeters thick and having two lateral supporting edges which project slightly beyond the steel shank and support the drill on the wall of the drill hole, and by two end cutting edges which are inclined in a roof shape and carry out the actual material removal. However, other designs where the drilling head is formed by a plurality of cutting plates, each of which may possibly have only one end cutting edge and one lateral supporting edge, are known.

The cutting plates are produced by pressing the initial powder mixture of the desired material in die presses using a die, a top punch and a bottom punch which are movable relative to one another. In the most frequently used presses, the bottom punch is stationary, while the die and top punch can be moved on their own or together relative to the bottom punch. But other designs where the die is stationary and the top punch and the bottom punch are movable in the die are common.

According to the hitherto conventional pressing method, the cutting plates are pressed in such a way that the relative movement of the top punch and the bottom punch with regard to the die is effected in the longitudinal direction of the lateral supporting edge(s), that is to say in the axial direction of the cutting plate, i.e. the cutting plate is formed in an "upright" position in the die. The disadvantage with this "upright" production of the cutting plate is that the press stroke of the top punch must not extend directly up to the transition between rake face or chip breaker groove and the cutting edge, but has to end with a safety distance of about 0.5 mm before this transition in order to definitely rule out the possibility of the top punch becoming wedged in the die for tolerance reasons. On account of this safety distance, the cutting plate has a negative bevel of about 0.5 mm, so that the cutting edge has no real positive rake angle, since, with a conventional feed performance of the drill of about 0.1 mm per revolution, the positive rake angle adjoining the negative bevel does not come into effect to a sufficient extent. The chip breaker grooves on the rake face of the cutting plate cannot be designed in any desired manner either, for example in a curve shape, or such that they only run over part of the rake face; on the contrary, they must run uniformly and rectilinearly over the entire rake face, since otherwise the ejection of the cutting plate from the die would not be possible.

Further disadvantages of this "upright" production of the cutting plates are excessive pressing or even inadequate compaction at exposed points of the cutting plate. Furthermore, exact rounded portions in the corner region between end cutting edge and lateral supporting edge, as would be desirable for strength reasons for this cutting-tip part subjected to extreme stress, likewise cannot be produced solely by pressing. Such rounded portions without disturbing sharp-edged transition regions could only be produced by grinding, which cannot be tolerated for reasons of cost.

SUMMARY OF THE INVENTION

It is accordingly an object of the invention to provide a method of pressing a cutting tip and a cutting plate produced by the method, which overcomes the above-mentioned disadvantages of the heretofore-known devices and methods of this general type and which the aforesaid disadvantages of the "upright" production process are avoided.

With the foregoing and other objects in view there is provided, in accordance with the invention, a method of pressing a cutting plate for a drill bit, which comprises the following steps:

providing a die, a top punch, and a bottom punch defining therebetween a die space for forming the cutting plate with at least one end cutting edge running from a periphery to an axis of rotation of the drill bit and at least one lateral supporting edge having a flank for supporting on a wall of a drill bore;

placing powdery starting material in the die space and pressing the starting material between the top punch and the bottom punch substantially transversely to the axis of rotation of the drill bit and substantially parallel to the flank of the lateral supporting edge.

In other words, the objects of the invention are achieved in that the relative movement of top punch and bottom punch with respect to the die is effected essentially in the transverse direction of the cutting plate parallel to the flank(s) of the lateral supporting edge(s).

In this way, the cutting plate is pressed essentially in a "horizontal" position, which means that the pressed part, in this case, lies in the die in such a way as to be inclined by the clearance angle of the flanks of the lateral supporting edges. A pressed part in which the positive rake angle extends without an undesirable negative bevel directly up to the transition between rake face and cutting edge can thus be produced. Since the chip breaker groove in the method according to the invention is formed with the top and bottom punches and not by the shape of the die as in the known "upright" method, the chip breaker groove may assume any desired shape without ejection problems from the die occurring. The chip breaker groove may have any desired curve shape, may extend only over part of the rake face and may also have any desired prominences and recesses on the root of the chip breaker groove. The shape of the chip breaker groove is therefore no longer predetermined and restricted for reasons related to the pressing but can be produced without restrictions with the shape desired for an optimum cutting capacity.

Furthermore, excess pressing or inadequate compaction at exposed points of the cutting plate, as often occurs in the "upright" pressing method, is definitely avoided.

Since the lateral flanks of the cutting plate and the flanks of the end cutting edges are formed by the die in the method according to the invention, the clearance angles of these flanks are directly related to one another.

With the above and other objects in view there is also provided, in accordance with the invention, a cutting plate for a drill bit having a defined axis of rotation, comprising:
a cutting plate body produced according to the above-outlined method and formed with at least one end cutting edge extending from a periphery to an axis of rotation of the cutting plate defined by the axis of rotation of the drill bit, and with at least one lateral supporting edge having a flank for supporting on a wall of a drill bore.

In cutting plates which are pressed in an "upright" position according to the known method, the clearance angle of the flanks of the end cutting edges normally lies within a range of 30° to 40°. In order to achieve a clearance angle within a range of this order of magnitude with the method according to the invention, the clearance angles of the flanks of the lateral supporting edges would have to be within a range of over 50°, as a result of which the adequate stability of the lateral supporting edges would no longer be ensured.

In accordance with an added feature of the invention, a clearance angle of the flank(s) of the lateral supporting edge(s) is within a range of 10° to 15°.

In a cutting plate which is produced using the method according to the invention, it has therefore proved successful to design the clearance angles of the flanks of the lateral supporting edges within a range of 10° to 15°. This results in adequate stability of the lateral supporting edges. The clearance angles, resulting from these clearance angles, of the flanks of the end cutting edges thus lie within a range of 5° to 10°, which surprisingly is sufficient in most cases for a good cutting capacity.

In accordance with an additional feature of the invention, the end cutting edges having rounded peripheral cutting corners. Since, in the method according to the invention, the transition between the end cutting edges and the lateral supporting edges is formed by the die, it becomes possible to round this transition in any desired manner, which considerably improves the stability in this zone.

With the hitherto conventional pressing methods, the production of such rounded portions would be possible only with sharp-edged transition sections, which result in a considerable fracture risk for the cutting plate, or else the rounded portions would have to be ground on after the pressing, which generally has to be ruled out for such mass products for reasons of cost.

In accordance with another feature of the invention, the cutting plate has a bottom surface that is beveled with rounded longitudinal edges. The bottom surface of the cutting plate can be designed with bevels having rounded longitudinal edges by the method according to the invention. This measure serves to provide an improvement when pushing the cutting plate into the locating slot of the drill shank, where positioning studs are provided for fixing the cutting plate and for positioning it exactly in order to maintain a uniform distance from the slot wall for forming a good brazed connection. When conventionally produced cutting plates, which merely have beveling without a rounded portion of the longitudinal edges, are being pushed in, these positioning studs could be sheared off, which leads to poorly positioned and poorly welded cutting plates and thus to the drill being rejected.

Through the use of the method according to the invention, the production of cutting plates having rounded longitudinal edges at the bottom surface is made possible and the production reliability when producing the finished drill is thus markedly improved.

Other features which are considered as characteristic for the invention are set forth in the appended claims.

Although the invention is illustrated and described herein as embodied in a method of pressing a cutting tip, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 3 is a front view of a drill cutting plate produced using the method according to the invention; and FIG. 4 is an end view of the drill cutting plate of FIG. 3 in the mounted position in a drill bit.

DETAILED DESCRIPTION OF THE PREFERRED EMBODIMENT

Figure 1:
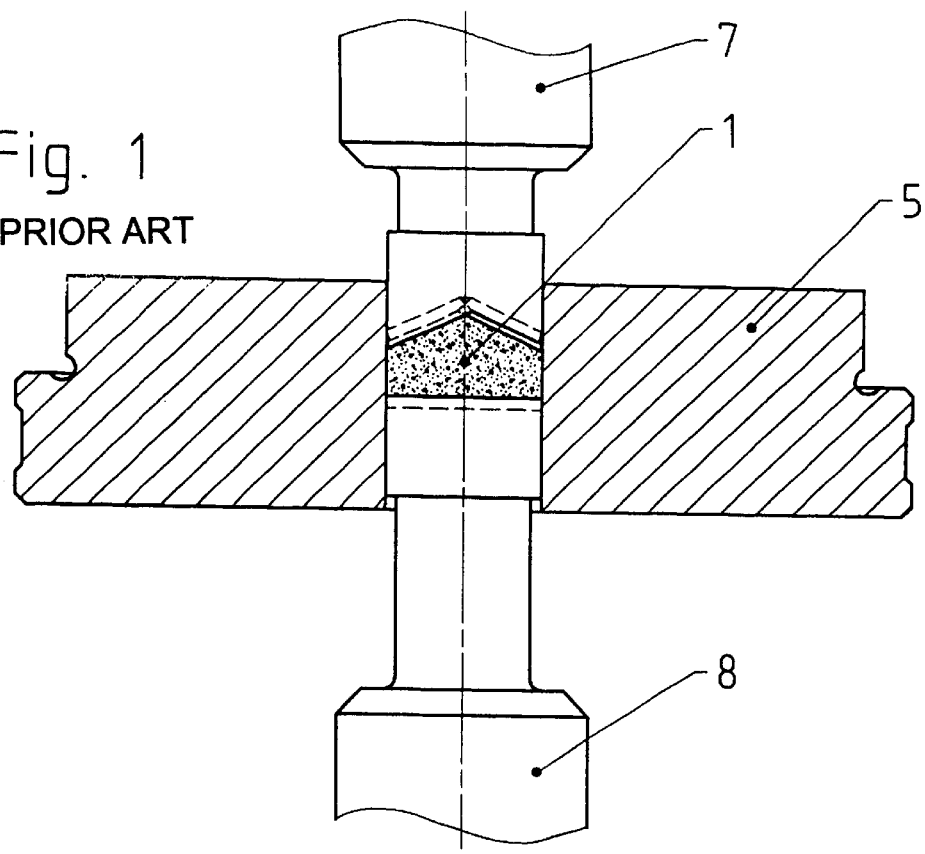
FIG. 1 is a diagrammatic sketch illustrating a pressing method according to the prior art for a drill cutting plate.

Referring now to the figures of the drawing in detail and first, particularly, to FIG. 1 thereof, there is shown, in principle, the conventional production of a drill tip or cutting plate 1 by pressing an initial powder mixture, for example of hard metal. A die 5, bottom punch 8 and top punch 7 are matched to one another in such a way that the cutting plate 1 is pressed in an "upright" position, i.e., the relative movement of top punch 7 and bottom punch 8 in the die 5 runs in the axial direction of the cutting plate 1.

Figure 2:
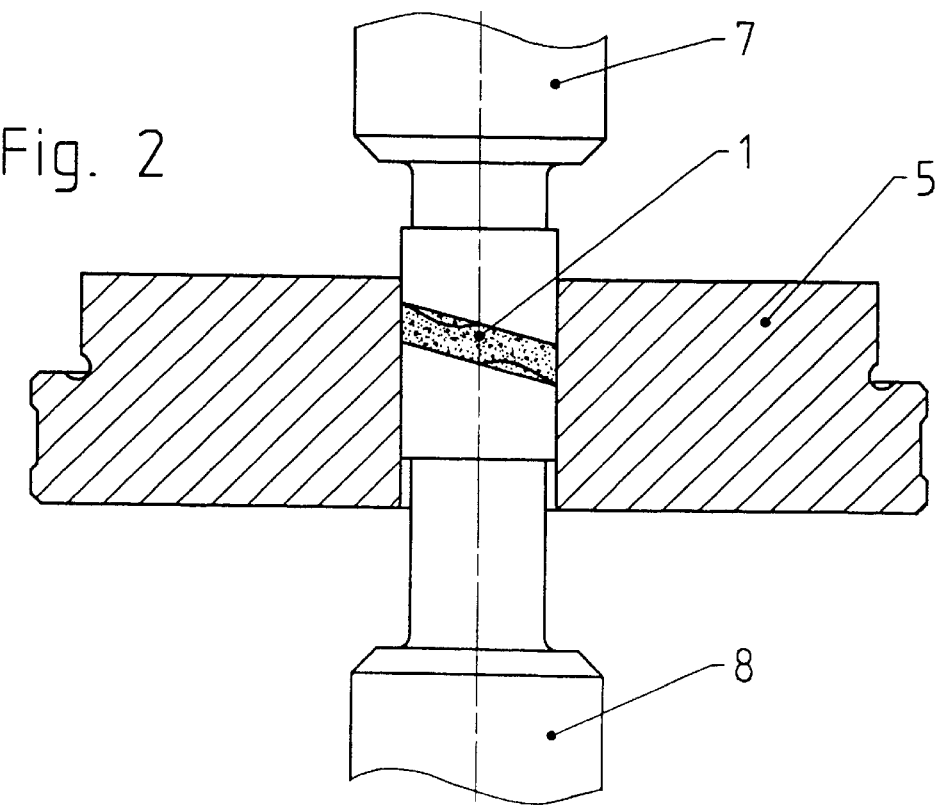
FIG. 2 is a diagrammatic sketch illustrating a pressing method according to the invention for a drill cutting plate.

In the process according to the invention illustrated in FIG. 2, the die 5, top punch 7 and bottom punch 8 are matched to one another in such a way that the cutting plate 1 is pressed essentially in a "horizontal" position in the die 5, i.e., the relative movement of the top punch 7 and the bottom punch 8 with respect to the die 5 is effected substantially in the transverse direction with respect to the cutting plate 1 parallel to the flanks 4 of the lateral supporting edges 3 (see also FIGS. 3 and 4). Unlike the conventional "upright" pressing method, the chip breaker grooves 6 on the rake faces of the cutting plate 1 are not produced by the shaping of the die 5 but by the shaping of the top punch 7 and of the bottom punch 8. The shaping for the chip breaker grooves 6 may therefore be selected completely freely without the possibility that ejection problems from the die 5 may occur.

Referring now specifically to FIGS. 3 and 4, there is illustrated an especially advantageous form of a cutting plate 1 as can be produced by the use of the method according to the invention. Owing to the fact that the chip breaker grooves 6 are brought directly up to the end cutting edges 2, the cutting edges 2 have positive rake angles without an undesirable negative bevel. Furthermore, corner regions 9 between the end cutting edges 2 and the lateral supporting edges 3 have an exact circular arc form without disturbing sharp-edged transition regions. The flanks 4 of the lateral supporting edges 3 have a clearance angle of 15°, thereby resulting in a clearance angle of 8° for the flanks 15 of the end cutting edges 2.

With reference to FIG. 4, in an end view, the cutting plate 1 can be seen in the fitted state in a drill bit shank 12 before the brazing is carried out. Positioning studs 14 fix the cutting plate 1 in the desired position in a recess 13 formed in the drill shank 12. A bottom surface 10 of the cutting plate 1 has bevels with rounded longitudinal edges 11, as a result of which shearing of the positioning studs 14 and thus a poorly positioned cutting plate 1 in the drill shank 12 are avoided.

I claim:

1. A method of pressing a cutting plate for a drill bit, which comprises the following steps:

providing a die, a top punch, and a bottom punch defining therebetween a die space for forming the cutting plate with at least one end cutting edge running from a periphery to an axis of rotation of the drill bit and at least one lateral supporting edge having a flank for supporting on a wall of a drill bore;

placing powdery starting material in the die space and pressing the starting material between the top punch and the bottom punch substantially transversely to the axis of rotation of the drill bit and substantially parallel to the flank of the lateral supporting edge.

2. A cutting plate for a drill bit having a defined axis of rotation, comprising:

a cutting plate body produced according to the method of claim 1 and formed with at least one end cutting edge extending from a periphery to an axis of rotation of the cutting plate defined by the axis of rotation of the drill bit, and with at least one lateral supporting edge having a flank for supporting on a wall of a drill bore.

3. The cutting plate according to claim 2, wherein a clearance angle of the flank of the lateral supporting edge is within a range of 10° to 15°.

4. The cutting plate according to claim 2, wherein the at least one cutting edge has rounded peripheral cutting corners.

5. The cutting plate according to claim 2, wherein a bottom surface of the cutting plate is beveled with rounded longitudinal edges.

6. A method of pressing a cutting plate, which comprises the following steps:

providing a die, a top punch, and a bottom punch defining therebetween a die space for forming the cutting plate with at least one end cutting edge running from a periphery to an intended axis of rotation of the cutting plate and at least one lateral supporting edge formed with a flank;

placing powdery starting material in the die space and pressing the starting material between the top punch and the bottom punch substantially transversely to the axis of rotation of the cutting plate and substantially parallel to the flank of the lateral supporting edge.

* * * * *